US008108491B2

(12) United States Patent
Anglin et al.

(10) Patent No.: US 8,108,491 B2
(45) Date of Patent: Jan. 31, 2012

(54) METHOD AND SYSTEM FOR CONTROL OF ACCESS TO GLOBAL COMPUTER NETWORKS

(75) Inventors: Howard Neil Anglin, Austin, TX (US); Kandagatla Chaitanya, Round Rock, TX (US); Emily Jane Ratliff, Austin, TX (US); Elizabeth Silva, Austin, TX (US); Yvonne Marie Young, Bastrop, TX (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 12/433,190

(22) Filed: Apr. 30, 2009

(65) Prior Publication Data
US 2010/0281058 A1 Nov. 4, 2010

(51) Int. Cl.
*G06F 13/00* (2006.01)
(52) U.S. Cl. .......................... 709/219; 709/224; 709/225
(58) Field of Classification Search .................. 709/217, 709/219, 223, 224, 225
See application file for complete search history.

(56) References Cited

U.S. PATENT DOCUMENTS

| 6,292,210 B1 | 9/2001 | Gerszberg et al. |
| 6,987,462 B2 | 1/2006 | Bae et al. |
| 7,095,456 B2 | 8/2006 | Nakajima |
| 7,747,680 B2 * | 6/2010 | Ravikumar et al. ........... 709/203 |
| 2005/0134578 A1 | 6/2005 | Chambers et al. |
| 2005/0283814 A1 | 12/2005 | Scott et al. |

OTHER PUBLICATIONS

Scott S. Snibbe, Karon E. MacLean: Haptic Techniques for Media Control.
Scott Frees, G. Drew Kessler, Edwin Kay: PRISM Interaction for Enhancing Control in Immersive Virtual Environments. ACM Transactions on Computer-Human Interaction, Vo. 14, No. 1, Article 2 Publication date: May 2007.

* cited by examiner

*Primary Examiner* — Viet Vu
(74) *Attorney, Agent, or Firm* — Jeffrey LaBaw; Darcell Walker (57) ABSTRACT

A system for controlling access to global computer network comprises a gateway computing device and one or more remote computer devices that are connected to the gateway computing device. The remote computer devices will gain access to the global computer network system via the gateway computing device. In one application, the remote computer devices can communicate directly with the gateway computing device to control access to the global computer network system. The gateway computing device has the capability to store information about each remote computer device in the system. The gateway computer device can communicate with the remote computer device through local area or wide area networks.

8 Claims, 9 Drawing Sheets

Website Categories

News
Sports / Entertainment
Retail
Technology
Financial
Education
Public Service / Non-profit
Religious
Research
Government

FIG. 6a

Remote Device I.D.
Local Network I.D.
Permissible Website Categories

| News | Government |
|---|---|
| Research | Technology |

FIG. 6b

Remote Device I.D.
Local Network I.D.
Permissible Website Categories

| News | Government |
|---|---|
| Research | Financial |

FIG. 6c

| Remote I.D. | Gateway I.D. | Website Request |
|---|---|---|

| Beta I | DL W 008 | www.abctechnology.com |
|---|---|---|

METHOD AND SYSTEM FOR CONTROL OF ACCESS TO GLOBAL COMPUTER NETWORKS

CROSS-REFERENCE TO RELATED APPLICATIONS

This application is related to and claims priority from U.S. patent application Ser. No. 12/199,300 filed on Aug. 27, 2008, the contents of which are incorporated herein by reference.

FIELD OF THE INVENTION

This invention relates to a method and system for communications between a remote computing device and a global communications network and in particular to a method and system for establishing communications between remote computer devices and website on a global communications network by granting or denying access of the remote computer device to desired website on the global communications network.

BACKGROUND OF THE INVENTION

Global communication networks such as the Internet are a global system of interconnected computer networks that transmit to and receive data from various points on the network. These global communication networks are comprised of millions of private and public, academic, business, and government networks of local to global scope that are linked by copper wires, fiber-optic cables, wireless connections, and other technologies. These networks carry various information resources and services, such as electronic mail, online chat, file transfer and file sharing, online gaming, and the interlinked hypertext documents and other resources.

Today, common uses of global communication networks include electronic mail applications. The concept of sending electronic text messages between parties in a way analogous to mailing letters or memos predates the creation of the Internet. A second use is for remote access applications. These networks allow computer users to connect to other computers and information stores easily, wherever they may be across the world. The low cost and nearly instantaneous sharing of ideas, knowledge, and skills has made collaborative work dramatically easier. Not only can a group cheaply communicate and test, but the wide reach of the Internet allows such groups to easily form in the first place, even among niche interests. These networks provide a means for a computer file can be e-mailed to customers, colleagues and friends as an attachment. The Internet enables many existing radio and television broadcasters provide Internet "feeds" of their live audio and video streams. In addition, global networks provide a means for voice communications. There has been a recent increase in the use of these networks for telephone applications.

Global communication networks have provided a convenient vehicle to perform both personal and professional tasks. The heavy use of these networks for all types of tasks has created a dilemma in the workplace. In some instances, workers spend so much time on these communication networks, that personal productivity is impacted. As a result, many personal productivity websites and blogs recommend reducing the amount of website surfing you do by either shutting down your web browser or creating a script that detects 10 minutes or more of web browsing and reminds you that you should be working. While these solutions are good if you don't need to access the web for your actual work, they are not so good if you need to use the web to research problems, review documents or otherwise do your work.

Solutions exist that are used to limit how much of the web children can surf, (i.e. NetNanny). Similar filters are also in use in some corporations. This solution is different because it is built into the web browser and is configurable by the user for personal productivity purposes. It gives the individual control and allows for self-monitoring.

Web browsers currently have the concept of "profiles" but those profiles are limited in that they don't control the content that you can access and require a restart to switch from one profile (generally a user) to another. Some people use two different web browsers (IE and Firefox, for example) to set up "work" and "play" interfaces.

In many instances, it is difficult and unreasonable to be able to track individual websites. The number of sites that a user may access can exceed the reasonable capabilities of a system to track them.

There is a need for a method and system that can determine access to a global computer network system for a particular computing device to ensure work productivity.

SUMMARY OF THE INVENTION

Embodiments of the present invention describe a method and system that provide communications between multiple remote computer devices and a gateway computing device for the purpose of accessing a global computer network system such as the Internet.

The system of this invention comprises a gateway computing device and one or more remote computer devices that are connected to the gateway computing device. The remote computer devices will gain access to the global computer network system via the gateway computing device. In one application, the remote computer devices can communicate directly with the gateway computing device to control access to the global computer network system. The gateway computing device has the capability to store information about each remote computer device in the system. The gateway computer device can communicate with the remote computer device through local area or wide area networks.

When a user desires to access a website on a global computer network system, this method detects and intercepts the access attempt and determines whether the category of the website identified in the access attempt is accessible by the particular user. The determination of whether the desired website type is accessible to the user will depend on certain defined criteria. For example, websites that are categorized as sports or entertainment may not be accessible or may not be accessible during certain times during the workday. Access to websites categories could also be based on time limits in which users can only access a particular website for a limited amount of time. When the website determination is that the user can access the website category, access is granted to that remote computer device. When the determination is that the website type is not on an approved list, but is an allowable website, the user is granted access and the website is added to the profile for a remote computer device.

DETAILED DESCRIPTION OF THE INVENTION

The present invention provides a method and system that would manage access to certain network website locations. The objective of this management function is to increase productivity of the workers during the workday. The implementation of embodiments of this website management invention could be implemented through software stored on a network server machine.

Figure 1:
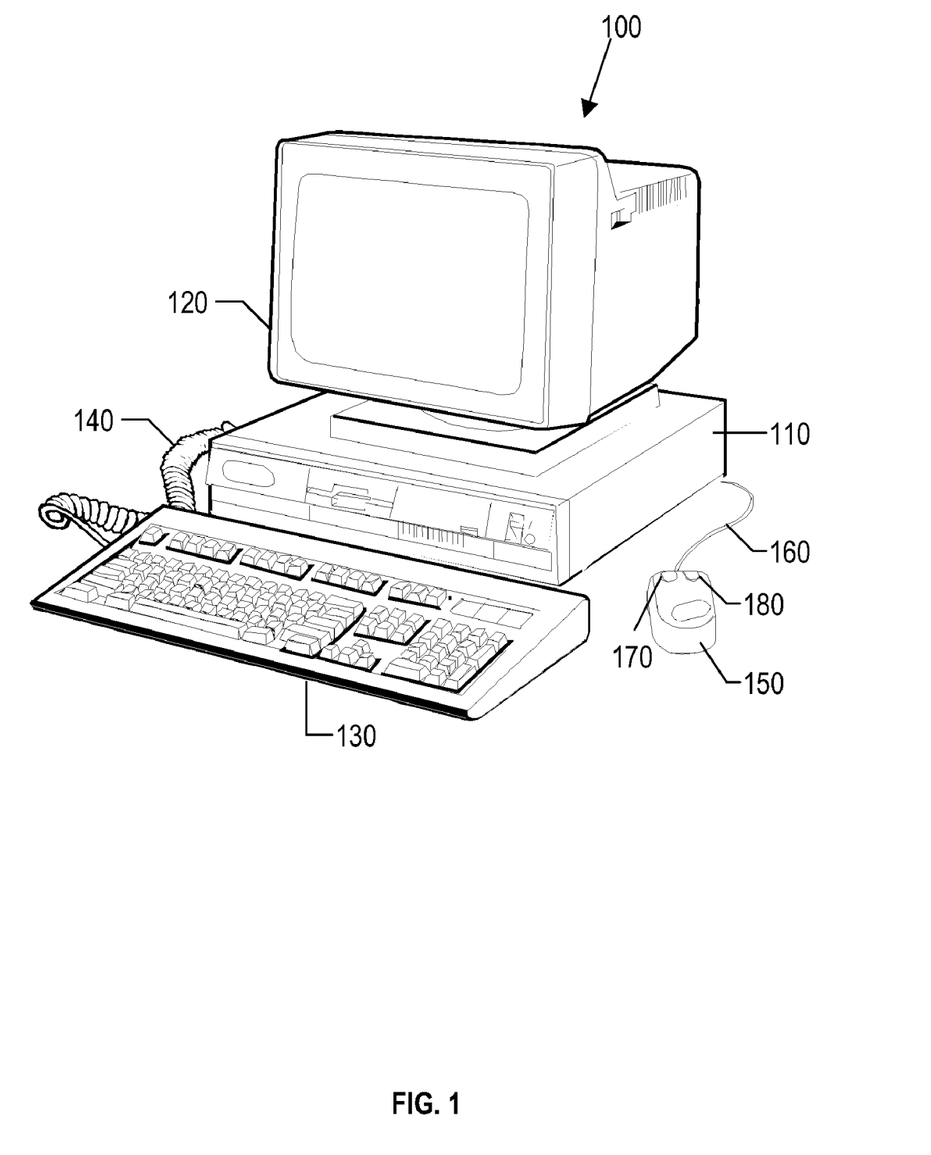
FIG. 1 is a pictorial representation of a personal computing device, which may be used in implementation of the present invention.

With reference now to FIG. 1, there is depicted a pictorial representation of computing device 100 which may be used in implementation of the present invention. Although the invention is described in terms of the device illustrated in FIG. 1, other types of electronic devices capable of transmitting and receiving information can be used in the implementation of the present invention. As seen in FIG. 1, data processing system 100 includes processor 110 that preferably includes a graphics processor, memory device and central processor (not shown). Coupled to processor 110 is video display 120 which may be implemented utilizing either a color or monochromatic monitor, in a manner well known in the art. Also coupled to processor 110 is keyboard 130. Keyboard 130 preferably comprises a standard computer keyboard, which is coupled to the processor by means of cable 140. Also coupled to processor 110 is a graphical pointing device, such as mouse 150. Mouse 150 is coupled to processor 110, in a manner well known in the art, via cable 160. As is shown, mouse 150 may include left button 170, and right button 180, each of which may be depressed, or "clicked", to provide command and control signals to data processing system 100. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 100 may be implemented utilizing a personal computer.

As mentioned, the method of the present invention may be implemented in a global computer network environment such as the Internet. With reference now FIG. 2, there is depicted a pictorial representation of a distributed computer network environment 220 in which one may implement the method and system of the present invention. As may be seen, distributed data processing system 220 may include a plurality of networks, such as Local Area Networks (LAN) 221 and 222, each of which preferably includes a plurality of individual computers 223 and 224, respectively. Of course, those skilled in the art will appreciate that a plurality of Intelligent Work Stations (IWS) coupled to a host processor may be utilized for each such network. Any of the processing systems may also be connected to the Internet as shown. As is common in such data processing systems, each individual computer may be coupled to a storage device 225 and/or a printer/output device 226. One or more such storage devices 225 may be utilized, in accordance with the method of the present invention, to store the various data objects or documents which may be periodically accessed and processed by a user within distributed data processing system 220, in accordance with the method and system of the present invention. In a manner well known in the prior art, each such data processing procedure or document may be stored within a storage device 225 which is associated with a Resource Manager or Library Service, which is responsible for maintaining and updating all resource objects associated therewith.

Figure 2:
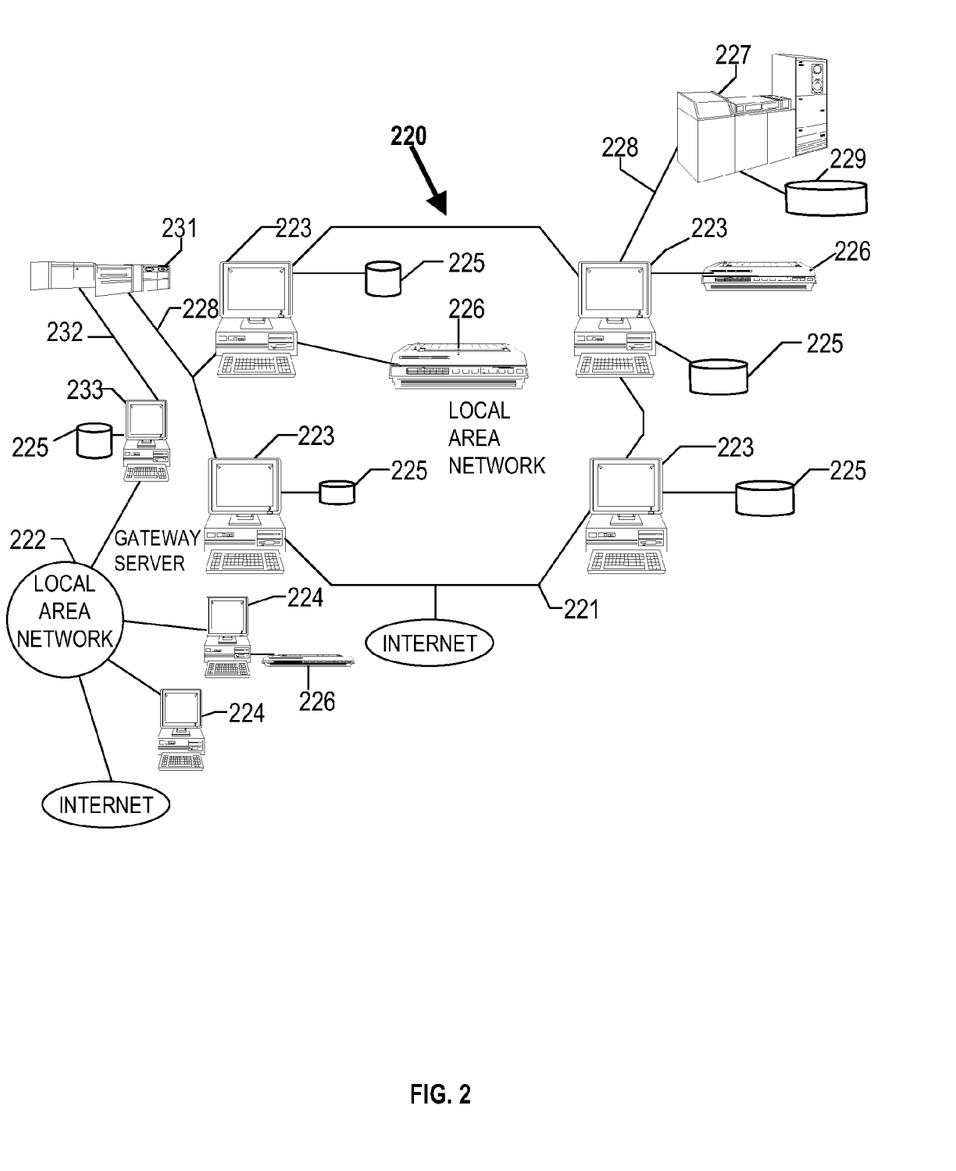
FIG. 2 is a diagram of a computer network over which messages and transactions may be transmitted.

Still referring to FIG. 2, it may be seen that distributed data processing system 220 may also include multiple mainframe computers, such as mainframe computer 227, which may be preferably coupled to Local Area Network (LAN) 221 by means of communications link 228. Mainframe computer 227 may also be coupled to a storage device 229 which may serve as remote storage for Local Area Network (LAN) 221. A second Local Area Network (LAN) 222 may be coupled to Local Area Network (LAN) 221 via communications controller 231 and communications link 232 to a gateway server 233. Gateway server 233 is preferably an individual computer or Intelligent Work Station (IWS) that serves to link Local Area Network (LAN) 222 to Local Area Network (LAN) 221. As discussed above with respect to Local Area Network (LAN) 222 and Local Area Network (LAN) 221, a plurality of data processing procedures or documents may be stored within storage device 229 and controlled by mainframe computer 227, as Resource Manager or Library Service for the data processing procedures and documents thus stored. Of course, those skilled in the art will appreciate that mainframe computer 227 may be located a great geographical distance from Local Area Network (LAN) 221 and similarly Local Area Network (LAN) 221 may be located a substantial distance from Local Area Network (LAN) 224. That is, Local Area Network (LAN) 224 may be located in California while Local Area Network (LAN) 221 may be located within Texas and mainframe computer 227 may be located in New York.

Figure 3:
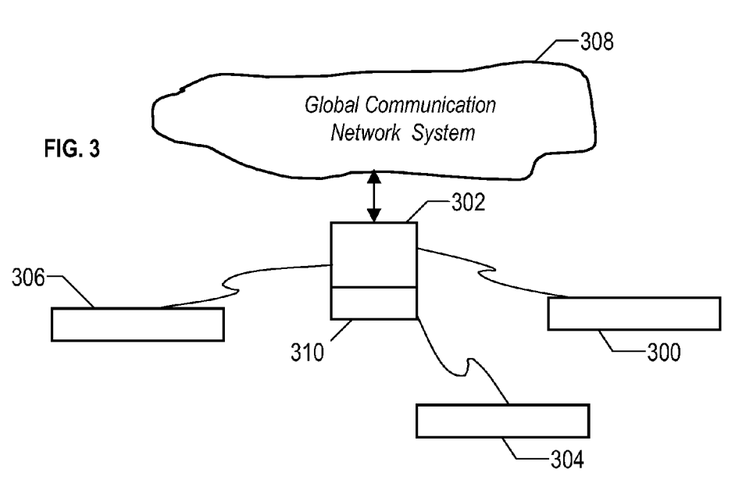
FIG. 3 shows a network configuration of the present invention having a gateway computing device and multiple remote computer devices in communication with the gateway computing device.

The system of the present invention shown in FIG. 3 could have a configuration that comprises the individual user terminals 300, 304, 306 in communication with a gateway computing device 302 and the global computer network system 308. This global computer network system could be the commonly known Internet.

The gateway computing device contains a software module 310 that has the capability to create and store profiles for each individual remote computer device connected to the gateway device. These remote computer profiles contain information about the categories of websites that the individual computer device can access through the gateway device. For a particular organization, these users could be the employees of that organization. The gateway device 302 could also have a software module that manages user access to communication network by controlling the amount of time any one user can access the network at one time. The gateway device 302 could also manage the user access by controlling the particular website a user can access at any particular time. As will be discussed, the gateway device can operate in various modes depending on the desires of a particular organization.

Figure 4:
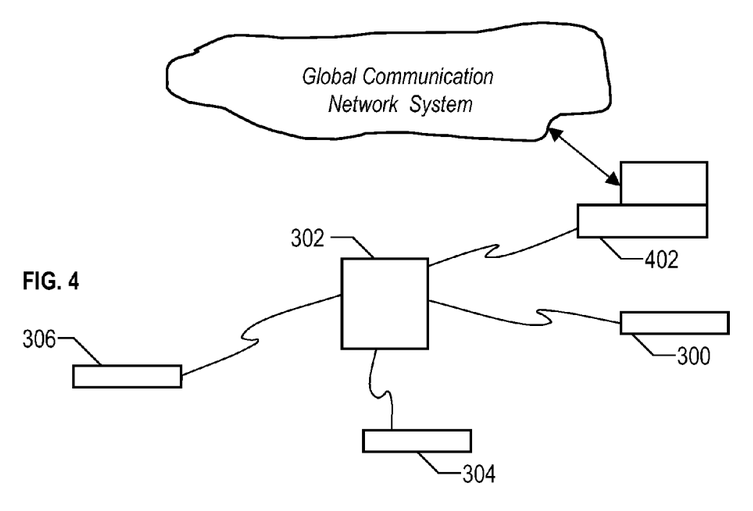
FIG. 4 shows a network configuration of the present invention having a gateway computing device, multiple remote computer devices and a program service provider.

In addition, the system of the present invention can also include a server device. FIG. 4 shows an embodiment of the present invention in which a programming server 420 is part of the network. In this configuration, the server device can provide the actual access to the global computer network system, while the gateway device does the access analysis. This service provider is like a centralized communication hub that receives and distributes programming to subscribers in a particular area. The inclusion of this service provider expands the local area network. Further, an embodiment of the present invention can provide for some communications between the gateway computing device 402 and the programming service provider device 420.

Figure 5:
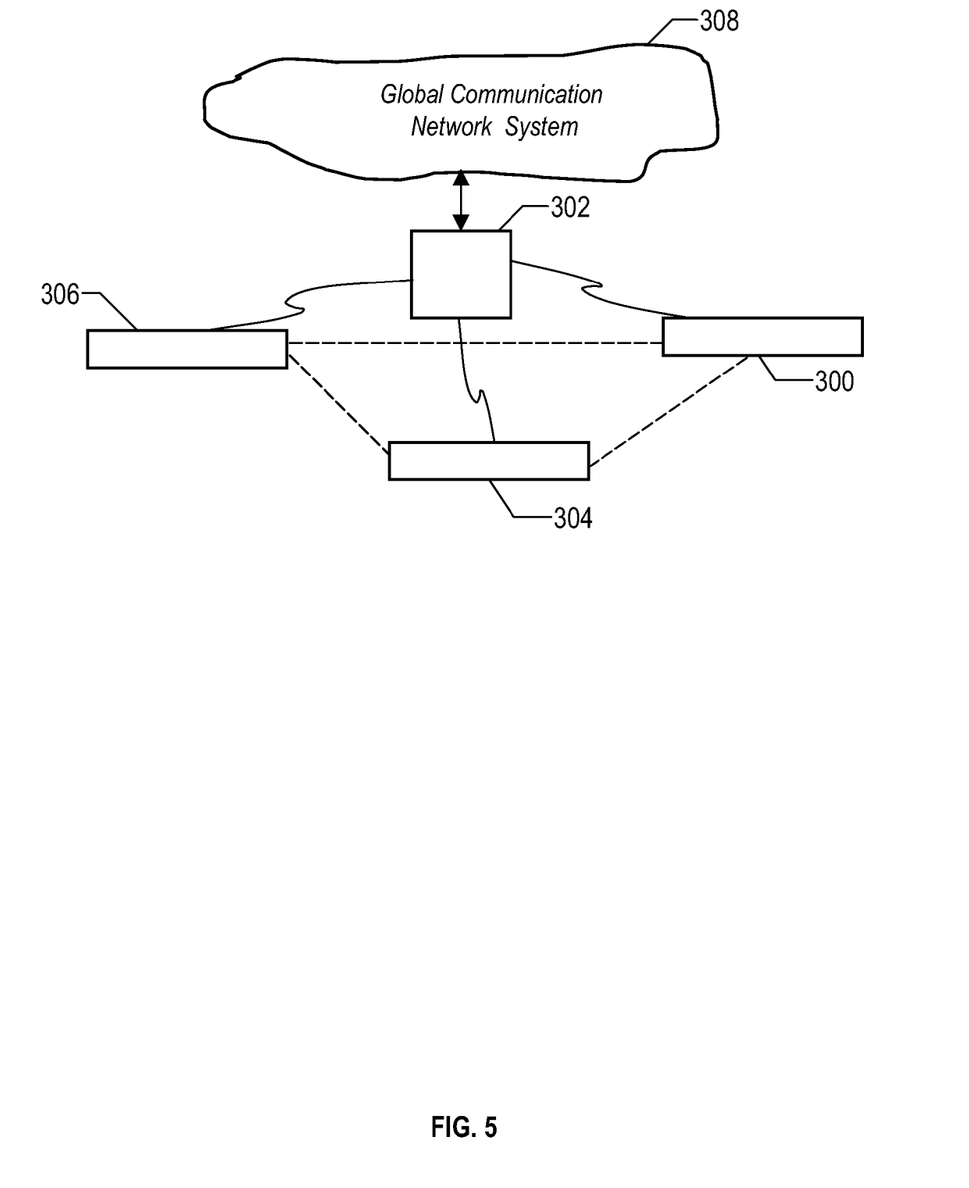
FIG. 5 shows a configuration of a gateway computing device and multiple remote computer devices in which the remote computer devices have the capability to interface with each and exchange information with each other.

FIG. 5 shows a configuration of a gateway device 302 and multiple remote computing devices 300, 304 and 306 in which these remote computing devices interface with each and exchange information with each other. In this configuration, a remote computing device can communicate information to the gateway device 302 or to another remote computer device on the same local network. One application of this communication is exemplified when a user assigned a remote computer device submits a request to modify the access profile for that remote computer device in order to restrictions currently on that particular remote computing device. The request would go to the gateway if that device contains the profile information for the remote computer device. If the remote computer device profiles are stored on another device, the request would go to that storage device. Because of the networking communication capabilities, the gateway device and remote computer devices can exchange information over the communication network. In addition, other types of communication exchanges can occur such as requesting information from the gateway computing device and another secondary controller with regard to a particular website.

An alternate network configuration of the present invention has a gateway computing device 302, remote computer devices 304 and 306, a remote computer device from another local network and a gateway computing device from the other local network. With wireless access capabilities, a remote computer device may be able to communicate with the gateway computing device of the different network. If this type of access attempt occurs, the gateway computing device 302 for the first local network can still detect the access attempt from a computing device of another local network and determine whether that particular remote computer device can access a desired website.

Figure 6A:
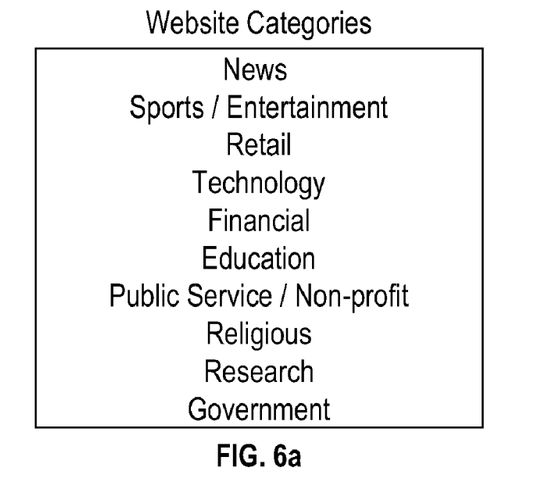
FIGS. 6a, 6b and 6c show configurations website categories and profile configurations remote computer devices.
Figure 6B:
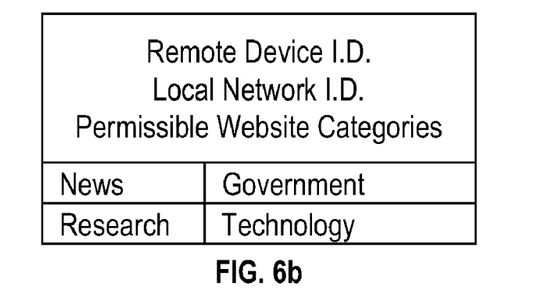
Figure 6C:
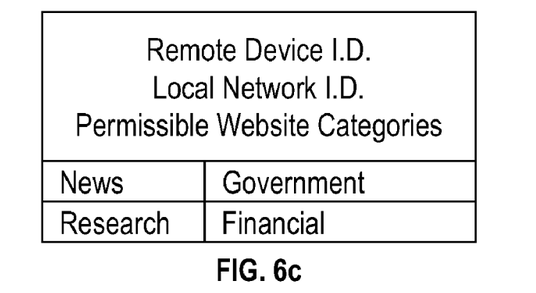

As mentioned, there can be a user profile for each person that will use one of the remote computer devices. Each remote computer device will require a user profile. FIG. 6a shows a list of website types under which websites could be categorized. FIGS. 6b and 6c show configurations for the storage of user profile information in the gateway computing device. In a user profile, shown is a field 602 that identifies a specific user or remote computer device. A second field 604 identifies a specific local network for that remote computing device. This approach is similar to some satellite companies that have the ability to track the number of receivers assigned to one subscriber. The identities could be assigned by a service provider or could be originated by the subscriber (the employer/company). When originated by the subscriber, the remote identities could be transmitted to the gateway computing device or even to the service provider. The other information stored in the user profile is the set of permissible website categories for the user or remote computer device. These website categories can indicate the types of websites the user of the particular remote computing device can access. In another embodiment, the user profile could be portable in that regardless of the remote computer device or a particular gateway computing device, the profile of the user desiring to access a website can be monitored from any gateway computing device.

FIGS. 6b and 6c show examples of two profiles. The profile of FIG. 6b has permissible website categories that include: news, research, government and technology. The profile for the computer device of FIG. 6c has permissible website categories that include: news, research, government and financial. In either profile, if the user of the computer attempted to access a website in a category that is not listed in the categories of permissible websites, in normal operations of the present invention, the gateway computing device would deny access to the access attempt.

Figure 7:
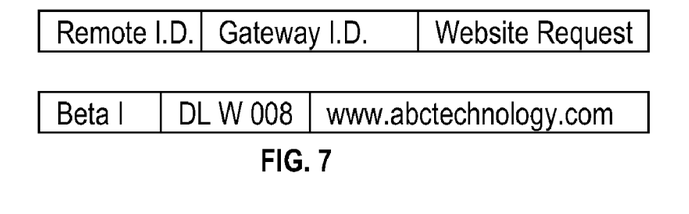
FIG. 7 shows the configuration of data for a website request submitted by a remote computer device.

FIG. 7 shows a record containing data for a website request made by a remote computer device. The information contained in a transmitted request includes the identification of the remote controller, the local network of the remote controller and the desired or requested channel. The record in FIG. 7a indicates fields 702, 704 and 706 for this information. In the embodiments of the present invention, each remote computer device and each user can be included in the indicated fields. In FIG. 7b, the remote computer device identification field 702 is designated with the identity "Beta I". The user identity is "DLW008". These two fields 702 and 704 can be preset with these identities stored in the gateway. When information is transmitted from a remote computer device, the gateway receiving the transmission can identify the remote computing device and the user of the device. As will be shown in FIG. 9, the information with regard to the user identification will be useful in determining the status of a website request.

Figure 8:
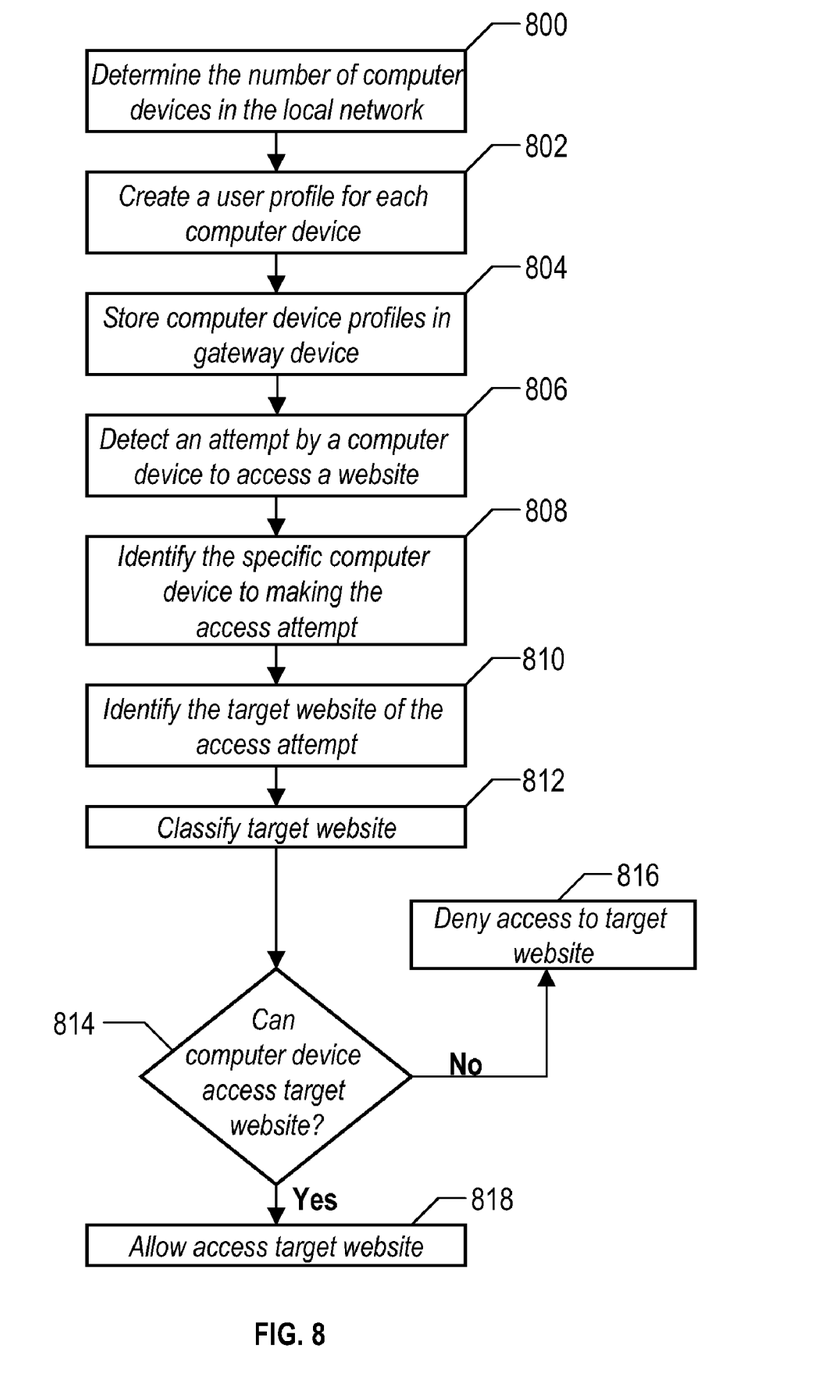
FIG. 8 is a flow diagram of an embodiment of the method of the present invention that evaluates an access attempt of a website by a remote computer device.

FIG. 8 is a flow diagram of an embodiment of the method of the present invention that evaluates an access attempt by a user to a website. In this method, there is a configuration of the local network in which there will usually be a gateway computing device and multiple remote computing devices. This local network is typically one that is implemented within a company or corporation. In the initial step, 800, there is a determination of the number of remote computer devices in the local network. Generally, there can be only one gateway computing device in a local network. After the determination of the number of remote computer devices, in step 802, there is a creation of a user profile for each secondary device. The profile for a remote computer will comprise the specific identification of the remote computer 402 and a list of permissible website categories accessible for that specific user or remote computer device. The permission means that the set of website categories programmed in for a specific remote computer or user are the website categories that said remote or user is allowed to access. In the alternative, there can a restriction of website categories that the particular user or remote computer are prohibited from accessing. In step 804, the created profiles for each user or remote computer are stored in the gateway computing device. Alternatively the profiles for each remote can be replicated or stored on the service provider's servers 514, for later retrieval.

The method at this point goes into a monitoring state. In step 806, the method detects an attempt to access a website. This request detection initially occurs at the gateway computing device 402. This access request is channeled through the gateway computing device 402. The information in the website access request can be in the form of a record as discussed in FIG. 7. With the information contained in this record, step 808 determines the identity of the user or computer device making the website access request. Once the identity of the requester is known, this method can access the profile for that requester. Step 810 identifies the website of the access request. At this point, step 812 classifies the website that the requester is attempting to access. These classifications are to general categories such as news, religion or entertainment. The techniques for classifying websites can vary and can be based on URL and website contents. From the requester identity, the requester profile and the category of the target website, step 814 determines whether that particular requester is authorized to access that particular category of website. This access determination can be done by attempting to match the target website category with website categories listed in the requester profile shown in FIG. 6. The category matching will depend on what types of website categories are in the profile. As mentioned, the profile can contain the allowed website categories that a requester can access or the website categories that the requester is prohibited from accessing. In one scenario, when the profile contains permissible website categories, if the target website category does not match a category in the profile the method moves to step 816 which denies the access attempt of the requester. In a different scenario, when the prohibited website categories are in the profile, if the target website category matches a category in the profile, the method will deny the access attempt in step 816. With either scenario, if the determination is that access to the target website is allowed, the method moves to step 818, which allows access. At this point, the requester will be connected to the website that was the subject of the access attempt.

Figure 9:
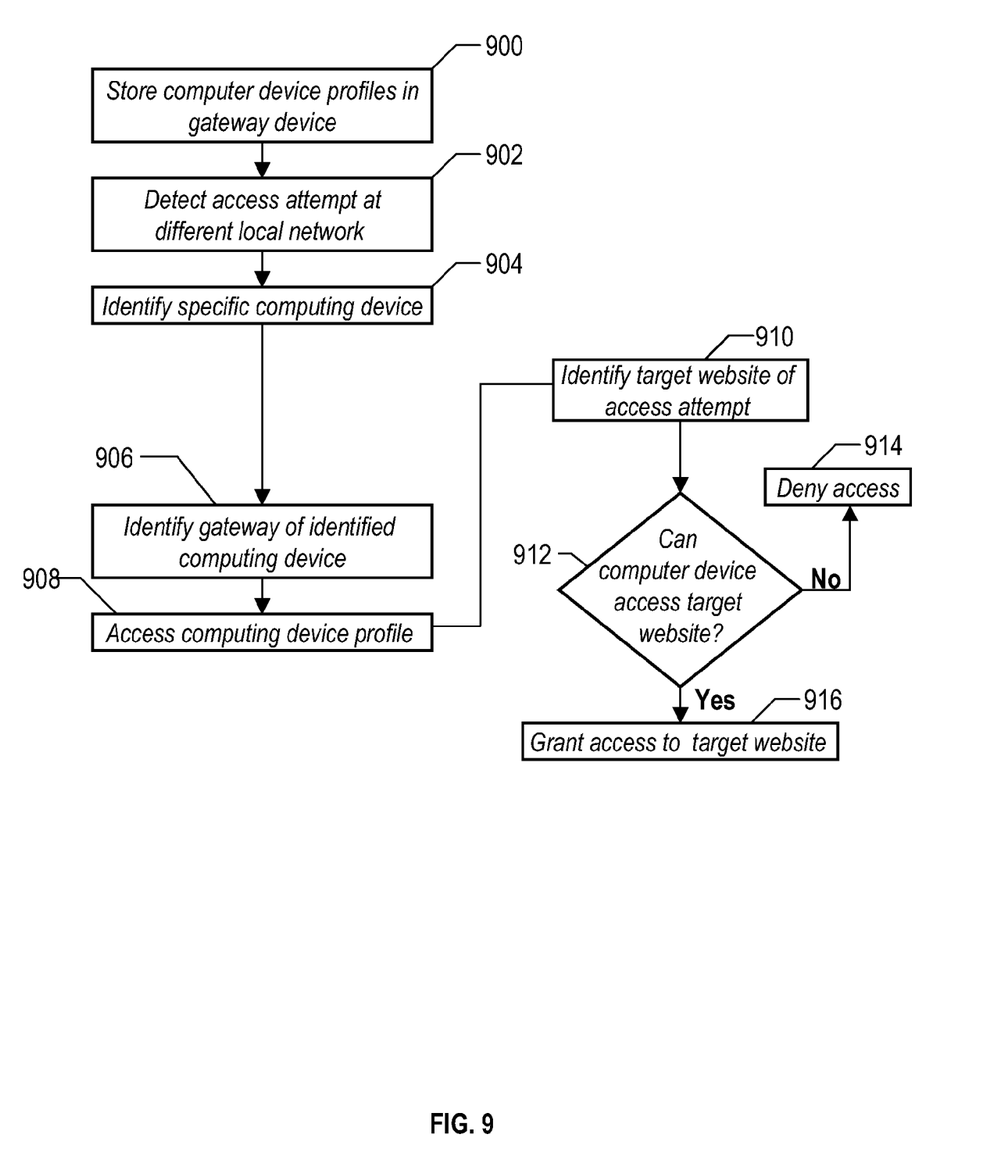
FIG. 9 is a flow diagram of an embodiment of the method of the present invention that evaluates an access attempt to a website by a remote computer device of one network through a gateway of another local network.

When multiple local networks have the same service provider, it is possible for remote computer devices from different local networks to communicate with each other, especially via wireless communication. In practice, a requester in one local network may attempt to access a website via a gateway of another local network. FIG. 9 describes the process that evaluates an access to, attempt by a remote computer device from one local network to a website via the gateway of a different local area network. This method helps ensure that users of remote computers cannot circumvent restrictions in their profiles by accessing programming information through a different gateway computing device.

In this method, step 900 stores a user profile for a remote computer device in the gateway device for the local network of that remote computer device. As with the other embodiments, this profile contains website categories to which the user can access or website categories for which the user has prohibited access. When the user of the remote computer device from the first network attempts to access a website via a second gateway device, step 902 detects the access attempt. This detection can occur at the gateway computing device of the second network. Step 904 identifies the requester of the access attempt. This identification step can occur at the device that detects the access attempt, which is the gateway device. The preferred approach is to have the gateway device for the second network detect and process the access attempt. If that device is not available, then the tuner for the second network can process the access attempt. The next step 906 is to determine the gateway device that is making the access attempt. This determination can be accomplished by identifying the network identity that is contained in the access attempt information and comparing that information with the information of the detecting gateway device. As previously mentioned, when a secondary remote transmits a request, the transmission contains the identity of the network of which the secondary remote is a part. The method then moves to step 908 and proceeds to identify the profile of the requester making the access attempt. The target website is also contained in the information transmission of the access request. At this point, there can be a determination that the requester is from a different local network. The gateway device detecting the access attempt can identify the gateway of the network of the requester and then retrieve profile information of the requester from the local gateway of the requester.

Once the requested website has been identified, step 910 determines the category of the target website. In this step 910, the website category can be determined in the same manner as in step 812. In step 912, there is a determination of whether the requester has permission to access that requested website. If the determination results in the requested website not being permitted, then the method moves to step 914, which denies the access attempt. If the determination is that the requester making the access attempt does have permission to access the requested website, the method moves to step 916 which allows access to the requested website.

Figure 10:
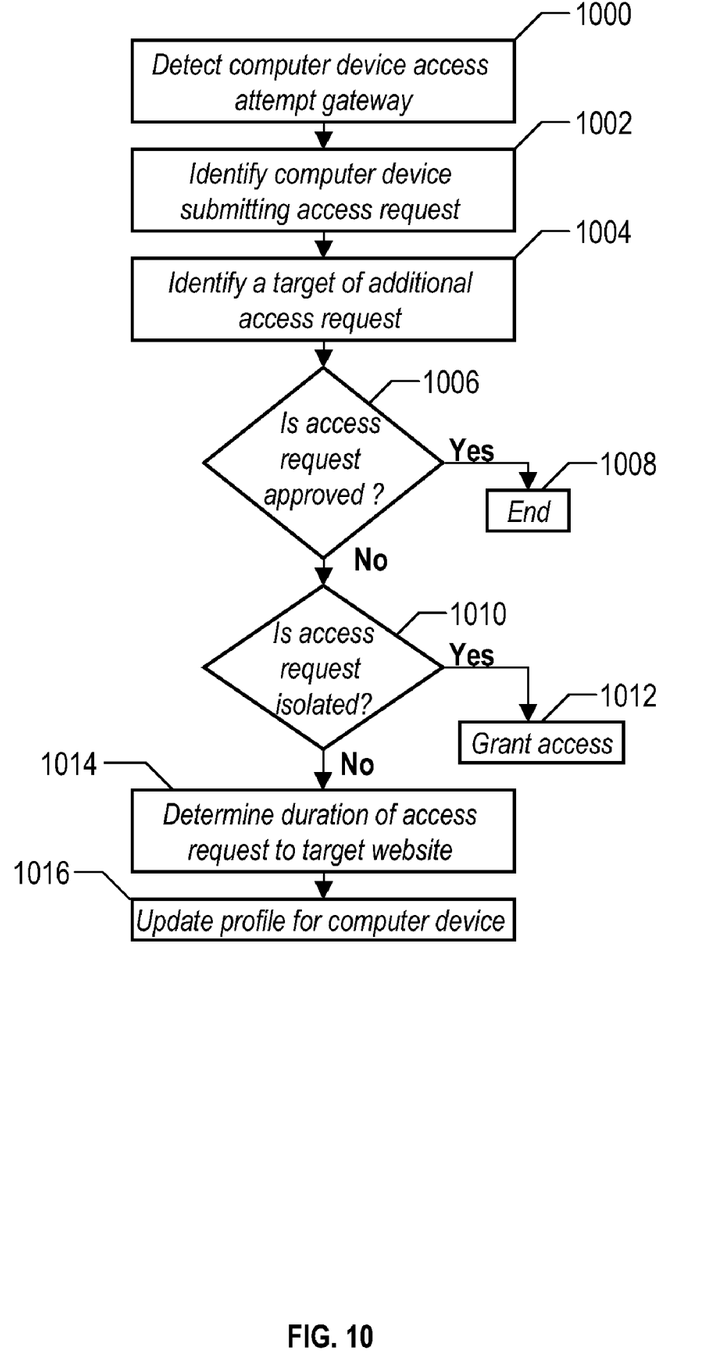
FIG. 10 is a flow diagram of an embodiment of the method of the present invention that evaluates communications between one remote computer device and a second remote computer device.

FIG. 10 shows the steps for an alternate embodiment of the present invention in which a requester is attempt to access a website that is in a category that is known to not be permissible to that requester. In this method, the requester is seeking to have the prohibited website added to their profile. Step 1000 detects the access attempt of a website by a requester at the gateway device. At this point, step 1002 identifies the computer device or user submitting the access request. Next, the identity of the target website is identified in step 1004. Step 1006 determines whether the target website is permissible to the requester. Again, this step is performed in the previously described manner by identifying the category of the target website and determining if that website category is permissible for this particular requester. If the requested website is permissible, the method moves to step 1008. At this step 1008, this method ends because the requester has received the desired access.

Referring back to step 1006, when the determination is that the requested website site is not permissible, then the process moves to step 1010. At this step, there is a determination that the requester is aware that the requested website is not on an permissible website category. The requester can make a special request for access to this website that is detected in step 1010. After detecting the special request, there can be a query to the requester to determine if the request is for a temporary or permanent access. If the request is temporary and there is decision to grant the request, the method moves to step 1012 where the requester is granted access to the requested website. The determination to grant this request could be done by a system manager or other systems personnel. There can also be a designated set of websites that may be universally accessible to any requester on isolated basis. If the duration of the access is more than an isolated request, step 1014 will determine the duration of the access request. The duration could be permanent or for some limited time period that is beyond more than an isolated requested. Step 1016 will then update the profile of the requester to indicate the change.

Figure 11:
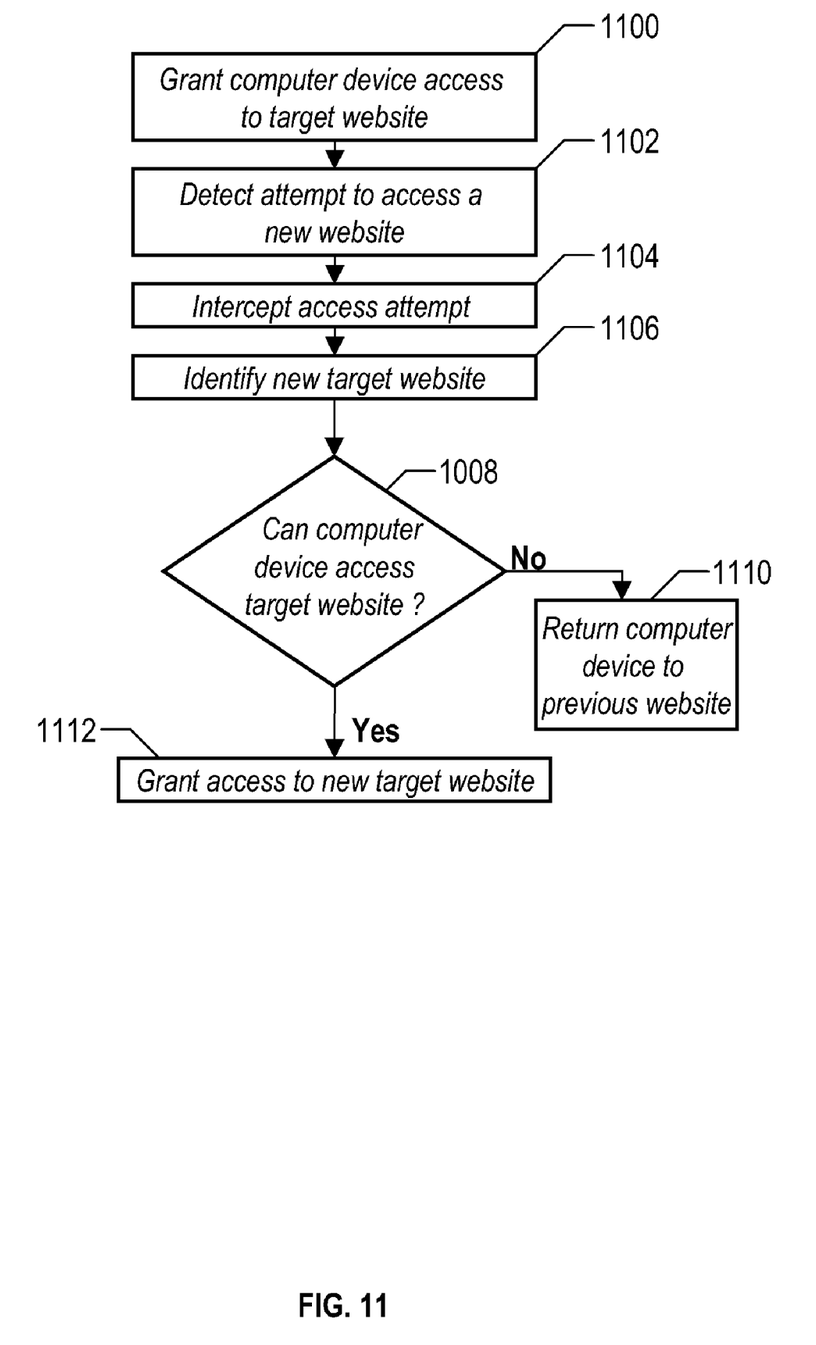
FIG. 11 is a flow diagram of an embodiment of the method of the present invention that monitors the ability of a computer device to access a second website from a presently grant first website.

Another embodiment of the present invention circumvents a user's attempt to navigate to another website once the user has accessed a website. It is quite normal for a user to move from one website to a second website. Without any restrictions on the present system, a user could use the access to a permissible website to move to and access a website that is not permissible to the particular user. In this method, step 1100 grants the requester access to a requested website. This portion of the method granting the user initial access to a website has been described in the previous embodiments of the invention. Step 1102 will detect an attempt by the user to access a different website from the currently accessed website. At this point, this access attempt will be intercepted in step 1104. This new website is identified and categorized in step 1106. Step 1108 will then determine if the user is permitted to access websites of the determined category of the website that is the subject of the access attempt. If the determination of step 1108 is that the user does not have permission to access this website category, the user is returned to the previous website to which the user had access in step 1110. If the user does have permission to access the new website, the user is granted access to the website in step 1112.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape floppy disc, hard disk drive, RAM, and CD-ROMs.

We claim:

1. A method for controlling communication network access for remote computer devices comprising:
    determining a number of remote computer devices in a system, the number of remote computer devices including one or more remote computer devices;
    creating a remote computer device profile for each remote computer device, the profile defining control limitations for each remote computer device;
    detecting at a gateway computing device an attempt by a remote computer device to access a target website through the gateway computing device and a request by a remote computer device to a website knowingly not in the profile of the remote computer device making the access request;
    identifying the specific remote computer device making the access attempt;
    identifying a website category type for the target website of the access attempt; and
    determining whether the remote computer device making the access attempt is allowed to access websites in the identified category the target website of the access attempt; and
    when access to the requested website is allowed, determining whether the term of the access to the requested website is a one-time 1 access; and when the determination is that the access request is for an extended time period, updating the profile for the remote computer device to include the accessed website.

2. The method as described in claim 1 wherein said creating a remote computer profile for each remote computer device further comprises creating a record containing identities of categories of websites permissible that are for a particular remote computer device and storing the record of permissible website categories in a database.

3. The method as described in claim 1 wherein said determining whether a website is accessible by a particular remote computer device further comprises comparing the identified website category of the target website for which access is attempted with the permissible website categories in profile of the remote computer device to determine whether the identified website category is in the remote computer profile and determining whether to grant access to the website to the particular remote computer device based on the comparisons of the identified website category and the website categories in the secondary remote computer profile.

4. The method as described in claim 3 further comprising after said creating a remote computer device profile for each remote computer device, storing the created remote computer profiles in the gateway computing device.

5. The method as described in claim 4 wherein said detecting an attempt by a remote computer device to access a website through a gateway computing device further comprises determining whether a remote computer device making the access attempt is part of the same local network as the gateway computing device detecting the access attempt.

6. The method as described in claim 5 further comprising, when the determination is that the remote computer device making the access attempt and the gateway computing device detecting the access attempt are not on the same local network, identifying the local network of the remote computer device making the access attempt by accessing the profile of the remote computing device.

7. The method as described in claim 1 further comprising after said determining whether to grant access granting access to the website that is the target of the access attempt by removing website blockers to the target website.

8. A method for controlling communication network access for remote computer devices comprising:
    determining a number of remote computer devices in a system, the number of remote computer devices including one or more remote computer devices;
    creating a remote computer device profile for each remote computer device, the profile defining control limitations for each remote computer device;
    storing the created remote computer profiles in the gateway computing device;
    detecting at a gateway computing device an attempt by a remote computer device to access a target website through the gateway computing device, by determining whether a remote computer device making the access attempt is part of the same local network as the gateway computing device detecting the access attempt;
    identifying the specific remote computer device making the access attempt;
    identifying a website category type for the target website of the access attempt; and
    determining whether the remote computer device making the access attempt is allowed to access websites in the identified category the target website of the access attempt, by comparing the identified website category of the target website for which access is attempted with the permissible website categories in profile of the remote computer device to determine whether the identified website category is in the remote computer profile and determining whether to grant access to the website to the particular remote computer device based on the comparisons of the identified website category and the website categories in the secondary remote computer profile.

* * * * *